March 25, 1969
A. F. HANKEN
3,435,220
DUAL CHANNEL RADIATION GAUGE FOR IDENTIFYING MATERIAL COMPONENTS
Filed Feb. 26, 1965
Sheet 1 of 3
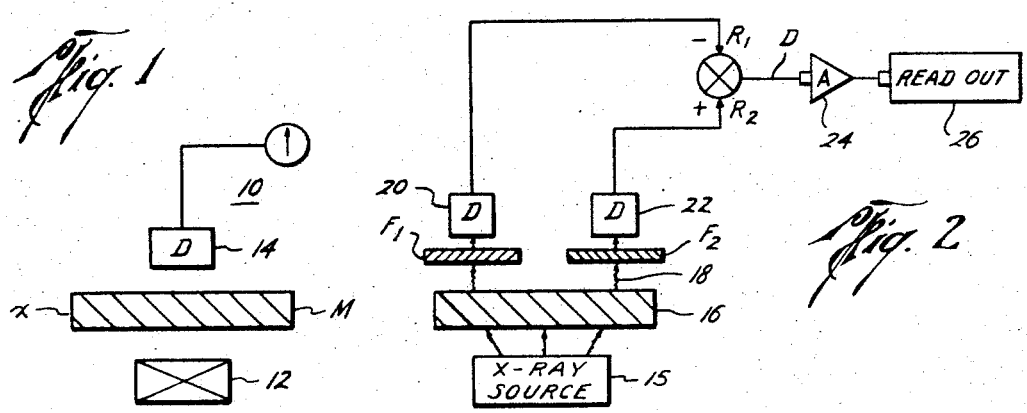
Fig. 1
Fig. 2
PRIOR ART
PRIOR ART
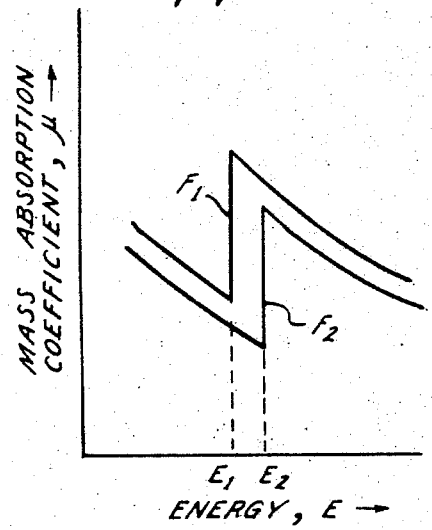
Fig. 3
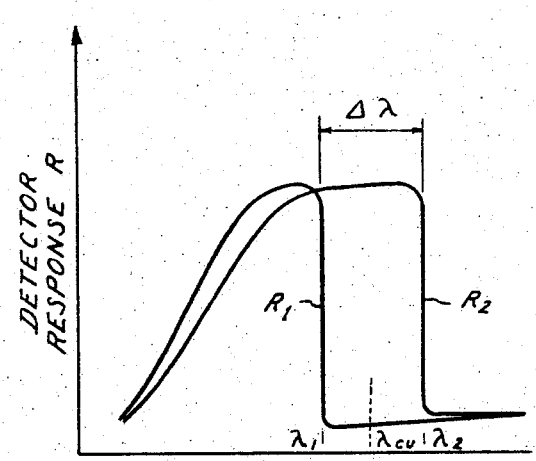
Fig. 4
Albert F. Hanken
INVENTOR.
BY
James J. O'Reilly
AGENT

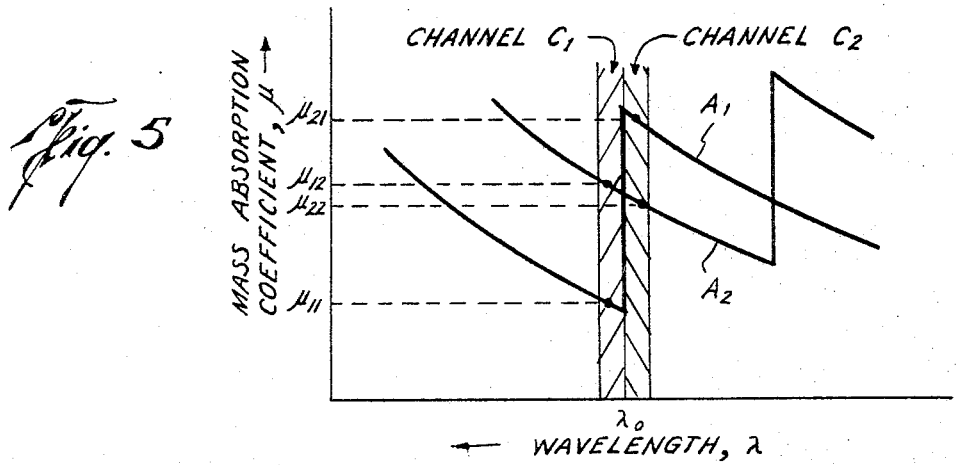
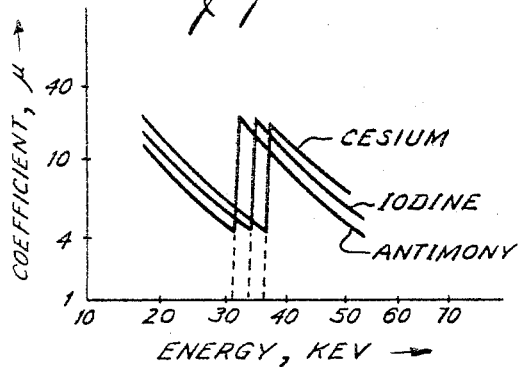
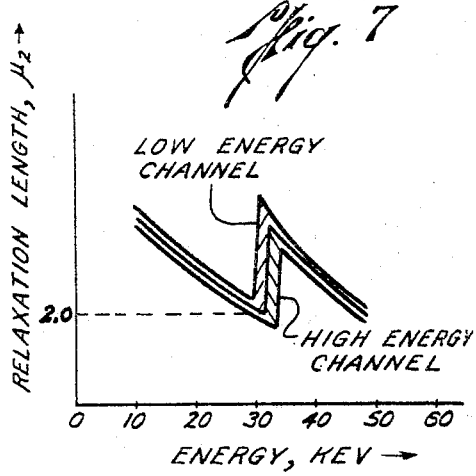
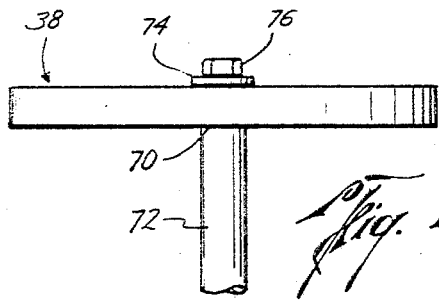
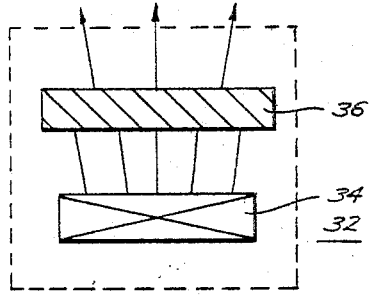
Albert F. Hanken
INVENTOR.

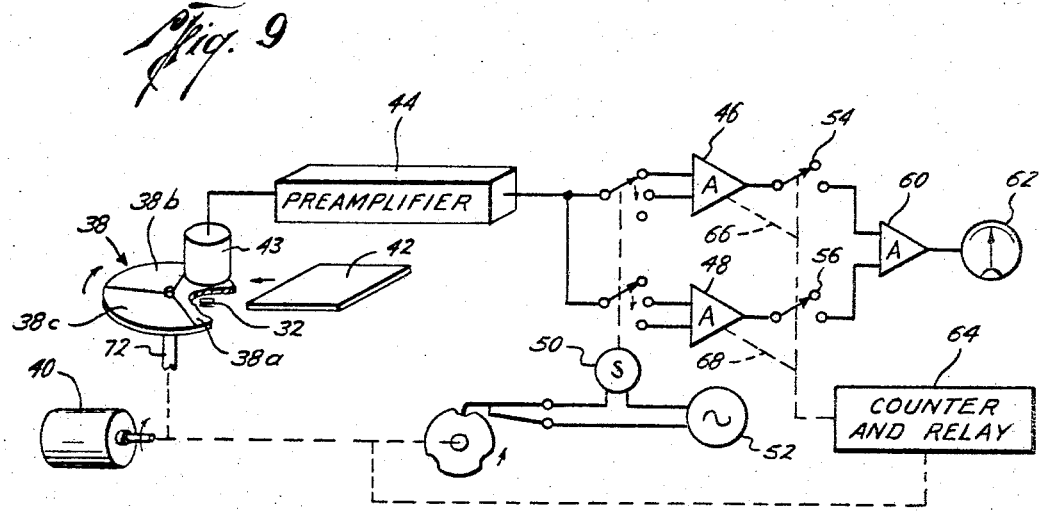
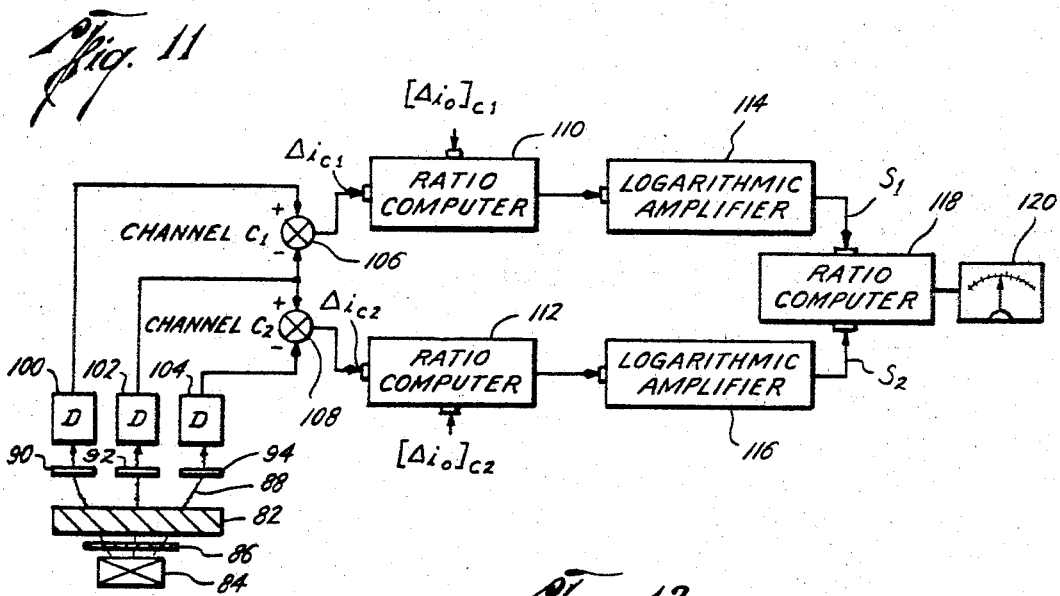
Albert F. Hanken
INVENTOR.
BY
James J. O'Reilly
AGENT

United States Patent Office 3,435,220
Patented Mar. 25, 1969

3,435,220
DUAL CHANNEL RADIATION GAUGE FOR IDENTIFYING MATERIAL COMPONENTS
Albert F. Hanken, Columbus, Ohio, assignor to the Industrial Nucleonics Corporation, a corporation of Ohio
Continuation-in-part of application Ser. No. 143,497, Oct. 6, 1961. This application Feb. 26, 1965, Ser. No. 435,434
Int. Cl. G01t 1/16; G01n 23/20; H01j 39/00
U.S. Cl. 250—83.3    20 Claims

ABSTRACT OF THE DISCLOSURE

A gauge for determining the presence and the weight of an element in a mixture by measuring the radiation transmitted through the material from a bremsstrahlung source in two energy bands. An energy band is established on either side of the K-edge energy of the element to be identified by two pairs of Ross filters. A pair of detectors provide signals proportional to the amount of radiation transmitted in the energy bands. The ratio of one signal to the other is computed to compare the relative absorption in each of the two energy bands.

---

This is a continuation-in-part of a copending application Ser. No. 143,497, filed Oct. 6, 1961, by Albert F. Hanken, now abandoned.

This invention relates generally to chemical composition analyzers and particularly to an improved method and means for identifying and determining the concentration of an element in a mixture of several elements.

Mixture analyzing devices of various types have been proposed but they have been generally unstable in operation. Many such devices utilize the Ross filter technique described in the June 1939 "Review of Scientific Instruments" (vol. 10, pages 186–191). Similar approaches are described in U.S. Patents 3,030,512 issued Apr. 17, 1962 to D. Harker and 3,100,261 issued Aug. 6, 1963 to J. E. Bigelow. These measuring systems utilize the K-edge effect which refers to the jump discontinuity in the mass absorption coefficient of a given element at the K-edge energy or wavelength. If radiation is passed through the element it will be generally absorbed to a greater degree the longer its wavelength or the lower its energy; however, at a wavelength only slightly longer than the K-edge wavelength the coefficient is many times smaller (and the absorption less) than at a wavelength shorter than the K-edge wavelength.

The prior art devices mentioned above utilize this phenomenon in the following manner to provide a measurement channel or "window" whereby radiation intensities falling within the wavelength width $\Delta\lambda$ of the window cause an indication and radiations of a wavelength falling without the window are not registered. The channel or passband is established by using a pair of elements of different, but not widely separated, K-edge wavelength. A first absorption measurement is made with one filter between the source of radiation and the detector and a signal obtained. A second absorption measurement is made with the second filter replacing the first one and a second signal is obtained. By then subtracting one signal from the other, a difference signal is provided that will be a function of intensity of radiation of a wavelength falling between the two filter element K-edges. For example, the apparatus of Harker will detect a monochromatic radiation emanating from a sample excited by an external radition source if it falls within the aforesaid passband. Since this wavelength is only excited when a particular element is present in the sample, a detected difference in filter transmission confirms the presence of the desired element providing, of course, other elements would not also excite a wavelength lying within the passband.

With these devices it has been difficult to provide a reliable indication of an element's presence due to the insufficient signal-to-noise ratio that results from this type of analysis approach.

The present invention overcomes these disadvantages by creating a high and a low energy channel about the K-edge energy of the element to be confirmed. Radiation absorption measurements of the mixture to be investigated are made in each channel. The absorption coefficient in the two channels will be different for only the element to be confirmed. The output signals from the two channels are compared and any differences therebetween are recorded.

More specifically, radiation of a wavelength extending on either side of the K-edge wavelength of the element to be identified in the sample is passed through the sample and a measurement is made of the respective absorption (or transmission) of radiation by said sample in two wavelength passbands or channels located spectrally about each side of the element's K-edge wavelength. For example, a different pair of filters may be provided for each passband. A signal is generated which is proportional to the amount of radiation transmitted by the sample in the relatively narrow wavelength segment defined by the filter pair associated with each passband. Due to the K-edge jump, the mass absorption coefficient will be different in each channel for only the element to be confirmed. Each signal will therefore differ greatly in magnitude only if the element in question is present. The mass cross-section of the element can be computed from either signal once the presence of the element is confirmed. In the event the element is not present, both signals will be substantially identical in magnitude, since the absorption coefficient for all other elements in the sample is substantially the same in either passband.

Accordingly, it is a primary object of the present invention to provide an improved method and apparatus for analyzing multi-component mixtures.

It is another object of the present invention to provide a mixture analyzing device that is more sensitive and stable than analyzers currently in use.

It is also an object of the present invention to provide a mixture analyzing device that can distinguish between elements having nearly the same atomic number.

It is yet another object of the present invention to provide a mixture analyzing device for more accurately determining the concentration of one of the components of the mixture.

It is still another object of the present invention to provide a mixture analyzing device that is simple to operate and calibrate.

These and other objects and advantages of the present invention will become more apparent upon reference to the following description when taken in conjunction with the drawings, in which:

FIGURE 1 is a diagrammatic view of a radiation absorption gauge;

FIGURE 2 is a diagrammatic view of a conventional dual filter sample analyzer;

FIGURE 3 is a graph illustrating the K-edge variation of filter mass absorption coefficient with energy or wavelength;

FIGURE 4 is a graphical illustration of the wavelength response of the analyzer shown in FIGURE 2;

FIGURE 5 is a graphical illustration useful in explaining the measurement method of the present invention;

FIGURE 6 is a graph showing the K-edge variations in mass absorption coefficients of three filter elements;

FIGURE 7 is a graph of relaxation length vs. energy for filters containing the elements represented in FIGURE 6 and constructed in accordance with the present invention;

FIGURE 8 is a sectional view of a broadband source of radiation useful in the present invention;

FIGURE 9 is a perspective view partly diagrammatic of one type of analyzer constructed in accordance with the present invention for carrying out the measurement method described in connection with FIGURE 5;

FIGURE 10 is a side elevational view of a filter mounting assembly used in the analyzer of FIGURE 9;

FIGURE 11 is an alternative embodiment of the present invention comprising a continuous sample analyzer; and, FIGURE 12 is a diagrammatic view of weight measuring apparatus to be used in connection with the continuous analyzer shown in FIGURE 11.

With reference to the drawings and specifically to FIG. 1, a typical radiation absorption gauge 10 for determining the physical characteristic of a material M is shown. A source 12 generates radiation which passes upwardly through the material and is partially absorbed thereby. The intensity of radiation at the face of a detector 14 is $$I = I_o e^{-\mu x} \quad (1)$$

where $I_o$ is the intensity with no absorber interposed between source and detector, $\mu$ is the mass absorption coefficient for the material under investigation and $x$ is the weight per unit area of the absorber.

If the material M is a mixture of elements, the presence of one which must be confirmed, a measuring system shown in FIG. 1 will not suffice since the total absorption is a function of the different mass absorption coefficients of each component as well as its relative concentration in the mixture which is not usually known. K-edge analyzers such as the one shown in FIG. 2 have been used to identify a component in a mixture and their operation rests on the K-edge phenomenon illustrated in FIG. 3.

Referring to FIGS. 2, 3, and 4, an X-ray source 15 irradiates a sample 16 and excites therefrom monoenergetic radiation 18 at a known wavelength if a particular element such as copper is present in the sample. A pair of filters $F_1$ and $F_2$ are placed in the path of this radiation as it travels toward detectors 20 and 22. The relative absorption of radiation in the filters $F_1$ and $F_2$ varies with energy or wavelength as shown in FIG. 3. It is apparent that the filter $F_1$ absorbs much more radiation of an energy between $E_1$ and $E_2$ than filter $F_2$, and that the absorption of radiation having energies less than $E_1$ or greater than $E_2$ is substantially the same in either filter. If the detectors 20 and 22 respond to radiation passing through the filters $F_1$ and $F_2$ to provide signals $R_1$ and $R_2$, the response will vary with wavelength $\lambda$ as shown in FIG. 4. Since wavelength and energy are inversely related, they can be plotted on the same graph. It is apparent that the filter $F_2$-detector 22 combination does not respond to radiation of a wavelength shorter than $\lambda_2$ and that the filter $F_1$-detector 20 combination does not respond to radiation shorter than $\lambda_1$. Wavelengths $\lambda_1$ and $\lambda_2$ correspond to energies $E_1$ and $E_2$ shown in FIG. 3. By subtracting one signal from the other, one obtains a difference signal D (see FIG. 2) that is proportional to the amount of detected radiation falling within the wavelength interval ($\lambda_1$, $\lambda_2$). Accordingly, the filters $F_1$ and $F_2$ are selected of materials having K-edge wavelengths $\lambda_1$ and $\lambda_2$ so that the copper wavelength $\lambda_{cu}$ of excited radiation 18 falls inbetween. The difference signal amplifier 24 drives a readout device 26 that indicates the presence of copper in the sample 16. If no copper is present the difference signal will be very small.

This approach has several problems, not the least of which is a poor signal-to-noise figure. I have invented an improved approach which is best understood by referring to FIG. 5. Assume it is required to ascertain the presence of an element $A_1$ in the sample to the exclusion of all other elements such as element $A_2$. Considering only the narrow wavelength region about the K-edge wavelength $\lambda_o$ of element $A_1$, it is noted that the mass adsorption coefficients of the two elements behave very differently. For example, to the short wavelength side of $\lambda_o$, element $A_1$ exhibits a much larger absorption coefficient than it does to the long wavelength side of $\lambda_o$. In contrast, the element $A_2$, not only is the coefficient smaller on the short wavelength side of $\lambda_o$ than it is on the long wavelength side, but it also is substantially the same value.

In accordance with the present invention, I provide a first measuring channel $C_1$ on the long wavelength side of the K-edge wavelength $\lambda_o$ of the element to be identified and a second measuring channel $C_2$ on the short wavelength side of $\lambda_o$. Each measurement channel $C_1$ and $C_2$ is created with filters containing elements whose K-edge wavelengths define the limits of the channel passband. Radiation of a relatively wide wavelength spectrum is directed through the sample to be analyzed and the filters. Since absorption coefficients $\mu_{12}$ and $\mu_{22}$ are nearly equal, the absorption of radiation will occur to substantially the same degree in each channel if the desired element is absent. Only when it is present will the absorption be different in each channel and then it will be vastly different as graphically implied by FIG. 5 in comparing absorption coefficients $\mu_{11}$ and $\mu_{21}$.

The weight per unit area or areal density $x$ of the element in the sample once confirmed can be obtained from either channel as hereinafter explained.

Theoretical considerations of approach feasibility

For this section, assume that both elements $A_1$ and $A_2$ are already present in the sample and that they exhibit the following absorption coefficients:

TABLE I

| Element | Channel $C_1$ | Channel $C_2$ |
|---------|---------------|---------------|
| $A_1$   | $\mu_{11}$    | $\mu_{21}$    |
| $A_2$   | $\mu_{12}$    | $\mu_{22}$    |

Also assume the weight per unit area or areal density of elements $A_1$ and $A_2$ to be $x_1$ and $x_2$.

The absorption law for channel $C_1$ will be $$I_1 = I_{o1} \exp{-(\mu_{11} x_1 + \mu_{12} x_2)} \quad (1)$$

and for channel $C_2$ $$I_2 = I_{o2} \exp{-(\mu_{21} x_1 + \mu_{22} x_2)} \quad (2)$$

where $I_1$ and $I_2$ are the measured intensities and $I_{o1}$ and $I_{o2}$ are the zero absorber intensities, i.e. the intensity measured with no sample between the source and the detector.

Taking the natural log of Equations 1 and 2 we obtain $$\ln I_1 = \ln I_{o1} - (\mu_{11} x_1 + \mu_{12} x_2) \quad (3)$$

$$\ln I_2 = \ln I_{o2} - (\mu_{21} x_1 + \mu_{22} x_2) \quad (4)$$

Picking for mathematical convenience, a constant $k$, we obtain from Equations 3 and 4

$$\ln I_1 - k \ln I_2 = \ln I_{o1} - k \ln I_{o2}$$
$$+ (k\mu_{21} - \mu_{11}) x_1 + (k\mu_{22} - \mu_{12}) x_2$$

From which $$x_1 = \frac{\ln I_1 - k \ln I_2}{k\mu_{21} - \mu_{11}} - \frac{\ln I_{o1} - k \ln I_{o2}}{k\mu_{21} - \mu_{11}} - \frac{k\mu_{22} - \mu_{12}}{k\mu_{21} - \mu_{11}} x_2 \quad (5)$$

The second term can be set to zero by adjusting the incident intensities $I_{o1}$, $I_{o2}$ or otherwise calibrating the analyzer.

$$x_1 = \frac{\ln I_1 - k \ln I_2}{k\mu_{21} - \mu_{11}} - \frac{k\mu_{22} - \mu_{12}}{k\mu_{21} - \mu_{11}} x_2 \quad (6)$$

Neglecting the last term of Equation 6, the error $e$ in determining $x_1$ will be $$e = \frac{k\mu_{22} - \mu_{12}}{k\mu_{21} - \mu_{11}} \cdot \frac{x_2}{x_1} \qquad (7)$$

Assuming a value for $k$ equal to the average value of $\mu_{12}/\mu_{22}$ for several elements, errors of less than 0.53% are involved in determining the weight per unit area $x_1$.

Since in most cases it is not known that an element $A_1$, for example, iodine is present, it is necessary to establish first the two required channels and then determine if there is any difference in absorption in each channel. Therefore, the selection of filter pairs to provide the bilateral passbands about $\lambda_0$ is now taken up.

Dual channel construction

Defining the selectivity of a filter pair as the ratio of the total intensity transmitted in the energy channel between the two K-edge energies to the total intensity transmitted in the entire energy spectrum, it may be said that the selectivity improves with the thickness of the filter. If the transmission is 50 percent in the channel compared to 10 percent at some energy outside the channel, doubling the filter thickness results in a transmission of 25 percent in the channel and one percent at the other energy. But the intensity decreases exponentially with filter thickness. It is possible to compute an optimum filter thickness that yields a suitable sensitivity with a selectivity required for a given measurement.

Referring now to FIGURE 6, the mass absorption coefficient of three selected elements is observed to be a generally decreasing exponential function of energy. However, sharp discontinuities exist at the respective K-edge energies of the three selected elements, antimony, iodine, and cesium, viz, 30.5 kev., 33.2 kev., and 36.0 kev. The jump is substantially the same for all three elements. Moreover, the absorption coefficients can be shown to be proportional in the low energy range, 15–300 kev., within three percent.

As seen from FIG. 6, the absorption coefficients are proportional. As the total absorption is proportional to $e^{-\mu x}$, by making the relaxation lengths $\mu_1 x_1 = \mu_2 x_2 = \mu_3 x_3$ where the subscripts refer to antimony, iodine, and cesium respectively, it is possible to obtain identical absorption or attenuation spectra in each of the filters. By arbitrarily selecting a relaxation length equal to approximately 2.0 at the low energy side of the K-edge discontinuity of the middle filter where $\mu_2 = 4.42$ cm.$^2$/gm., the iodine areal density $$x_2 = \frac{2.00}{4.42} = 0.450 \text{ gm./cm.}^2$$

Accordingly, the antimony and cesium densities are then fixed at 0.498 and 0.413 gm./cm.$^2$ respectively.

Referring to FIG. 7, using these values of filter thickness, the absorption curves are substantially identical, except in the vicinity of the K-edge energies. The differential output of the lower energy channel $C_1$ is of the form $$f_1(E) = e^{-\mu_2 x_2} - e^{-\mu_1 x_1}$$

Since the exponents are equal this function will be zero at all energies except between the K-edge energies of the antimony and iodine filters. At high energies in the region of Compton absorption the ratio $\mu_1/\mu_2$ tends to approach unity and will therefore be different from the ratio $\mu_1/\mu_2$ at low energies. However, this is not serious since $$\mu_1 x_1 = \mu_2 x_2 \ll 1$$

and the filters will be almost transparent for both salts. The ratio $\mu_1/\mu_2$ of the filter materials is not to be confused with the ratio $\mu_{11}/\mu_{21}$ which I compute to establish the presence of iodine in the sample. A similar discussion follows for the output of the high energy channel $C_2$ $$f_2(E) = e^{-\mu_3 x_3} - e^{-\mu_2 x_2}$$

with energy just below the K-edge energy. What is effectively created is a "window" comprising a low energy channel or passband and a high energy channel or passband wherein analysis can be efficiently performed. To further enhance the selectivity of the system the source and detector elements are, as hereinafter explained, constructed to be principally responsive to energies in the vicinity of the established "windows."

An ionization chamber is constructed to be sensitive only in the desired K-edge region and relatively insensitive at all other energies outside of this region. At low energies, the window of the chamber limits the energy response of the chamber; at high energies, the chamber gas and wall properties determine its sensitivity. If the wall material and chamber gas have approximately the same atomic number, the response of the chamber at high energies will be $$1 - e^{-\mu_g x_g}$$

where $\mu_g$ is the absorption coefficient of the chamber gas and $x_g$ the areal density of the gas. If the walls are made of low Z material, the efficiency at high energies will be lower compared to the efficiency in the K-edge region.

An ionization chamber has been designed for the present invention so that it presented a gas absorption of one relaxation length at the K-edge energy of the element to be investigated. And the walls were made of low Z materials to suppress the high energy response. A chamber using krypton gas under a pressure $p = 1.16$ atm. $= 2.35$ p.s.i.g. was found to be satisfactory. Assuming a wall of the same atomic number as the gas and neglecting the absorption of the 2 mil aluminum window, we obtain the following chamber efficiency N as a function of energy:

| Energy (kev.) | $\mu_g$, cm.$^2$/gm. | $\mu_g x_g$ | Efficiency N (E) |
|---|---|---|---|
| 10 | 43.9 | 2.94 | .948 |
| 15 | 124 | 8.31 | .999 |
| 20 | 55.7 | 3.73 | .936 |
| 30 | 18.01 | 1.21 | .702 |
| 33 | 15.0 | 1.00 | .632 |
| 40 | 7.85 | .525 | .409 |
| 50 | 4.10 | .274 | .240 |
| 60 | 2.45 | .164 | .148 |
| 80 | 1.08 | .072 | .072 |
| 100 | .57 | .038 | .038 |
| 300 | .0457 | .0031 | .0031 |
| 500 | .0307 | .0021 | .0021 |
| 1,000 | .0251 | .0017 | .0017 |

At energies greater than 80 kev., the efficiency decreases very rapidly. Observing the table with the graph of FIG. 6, although at energies greater than 80 kev., $f(E)$ still has an appreciable value, the ion chamber is so designed that the efficiency drops to very low values at these energies. Since the total output signal will be proportional to $f(E)N(E)$, this function is at a maximum around the K-edge of the desired element.

A source 32 of broadband radiation such as the bremsstrahlung generator shown in FIG. 8 may be used. A nuclear generator 34 directs beta radiation toward a target 36. The bremsstrahlung source 32 should have the peak of its energy spectrum in the same region as the function $f(E)N(E)$. An experimental formula gives this peak as a function of the target thickness and its atomic number $$E_{max} = AM^{0.2}Z^{0.7}$$

where:

M = thickness of target in gm./cm.$^2$
Z = atomic number of the target
A = constant depending on the source (8.2 for Sr 90).

Typical values are for an aluminum target

M = .300 gm./cm.$^2$
Z = 13 resulting in an
$E_{max}$ = 38.9 kev.

The peak energy is somewhat higher than the desired K-edge energy. However, it was felt that 300 mg./cm.$^2$ is about the minimum target thickness that can be allowed.

The combination of source, filter and detector spectra makes the system highly selective with respect to the two energy channels $C_1$ and $C_2$ around the K-edge (see FIG. 5). Furthermore, a combination of bremsstrahlung source, a filter with no changing properties and an ionization chamber provides a very stable measuring system. Because the absorption coefficients are not quite proportional just around the K-edge, the two channels will be somewhat distorted. In order to decrease this non-proportionality, the difference of the atomic number of the two elements making up the filter should be made as small as possible. In the preferred embodiment this difference is two.

The desirability and practicability of the approach having been demonstrated, various apparatuses may be relied upon to accomplish my novel analysis method.

EMBODIMENT I

With the reference now to FIG. 9, a rotary filter 38 is constructed to eliminate problems of drift. The filter 38 has three sections 38a, 38b, and 38c, each section covering about 100 degrees and containing a salt of antimony, iodine or cesium. The filter 38 is driven at a rotational speed of about 1 r.p.s. by a motor 40. Therefore, each of the filters will be between the source 32 and a sample 42 for about 300 msec. This will result in a pulse having a pulse height proportional to the intensity of the radiation and pulse duration of 300 msec. being generated by an ionization chamber 43. A preamplifier 44 feeds this pulse into amplifiers 46 and 48 each having a long time constant (about thirty sec.). The switching of the output of preamplifier 44 is controlled by either a micro-switch actuated by the filter 38 or a cam-operated stepping switch 50 driven by the motor 40 and powered by a supply 52.

In the operation of this system, the total intensity with the cesium filter 38a is measured and a signal fed into the positive input of amplifier 46. Then this input is grounded and during the next 300 msec. the intensity with the iodine filter 38b is measured and fed into the negative input of amplifier 46. In this way it will subtract from the previous signal. The difference of these two signals as measured over a time of 30 seconds will be proportional to the intensity of the window on the high energy side of the K-edge.

Similarly, the intensity on the low energy side of the K-edge is measured by amplifier 48 by coupling the output of preamplifier 44 thereto whenever the antimony filter 38c is positioned in the radiation beam.

At the end of the thirty second signal integration period, the outputs of amplifiers 46 and 48 are connected by switches 54 and 56 into an amplifier 60. Amplifier 60 forms the difference between the input signals and a meter 62 registers the difference which will be only a function of the amount of iodine present in the sample 42. A counter and relay circuit 64 coupled to the motor 40 may be used to actuate the readout switches 54 and 56 after a predetermined number of shaft revolutions. The counter 64 may also be used to reset the integrators of amplifiers 46 and 48 as indicated by the dotted lines 66 and 68.

The instrument wil measure the concentration of iodine in grams/cm.$^2$. If the area of the measuring cell 42 is known, the reading of meter 62 can be converted to grams. Since the total sample weight is available by other means such as a beam balance, the percent by weight of iodine is readily derivable.

Should no iodine be detected, the presence of another suspected element may be confirmed by changing the filter 38. With reference to FIG. 10, the filter 38 may be mounted on a threaded shoulder 70 of motor shaft 72. A washer 74 and lock nut 76 may then be fastened over the filter 38 to secure the same against the shoulder 70. It may be desirable to key the filter 38 on shaft 72. This would serve to index the filter 38 with the stepping switch 50 so that the appropriate filter element is registered for a given switch position.

To examine the sample for zirconium, a new filter containing salts of strontium, zirconium, and molybdenum would be inserted by loosening the lock nut 76 and washer 74, and replacing the old filter 38 with the new one. If the stepping switch 50 is in the position shown, care must be taken to insure that the molybdenum filter element is positioned in the measuring gap. The lower limit of detection is estimated at an atomic number $Z=32$, germanium having a K-edge energy of 11.1 kev. However, it may be feasible to extend this limit by using a beryllium or plastic target 36 and ionization chamber window.

EMBODIMENT II

Another construction is shown in FIG. 11. In this embodiment as well as the one previously described, what I disclose is a transmission type gauging system wherein a relatively broadband radiation is generated and passed through the sample and channel-defining filters before it is detected. This contrasts with the monoenergetic detection scheme heretofore proposed by the prior art. A source of broadband radiation 80 such as bremsstrahlung is located beneath the sample 82. The source may include a beta emitter 84 such as strontium 90 and a target material 86 that converts the incident beta to the desired brem or X-radiation 88. Instead of being a single emitter, the source could comprise two or more separate radiating members. The converted radiation 88 passes through the sample 82 and three separate filters 90, 92, and 94 and is detected by three separate detectors such as ion chambers 100, 102, and 104 each receiving radiation passing through a different filter. While three detectors are shown, it is appreciated that two detectors would work with substantially equal utility if a signal-storing, time-sharing switching arrangement is provided such as illustrated above in FIG. 9.

As in the above example, assume it is desired to check the sample 82 for the presence of iodine. To establish the two measurement channels about $\lambda_o$ (see FIG. 5), compounds having elements adjacent or neighboring iodine in the Periodic Table are selected for the filters 90–94. It should be pointed out that it is unnecessary to utilize measuring channels that are contiguous with the desired element's K-edge. Four different filters could be used to establish channels that are spectrally displaced from $\lambda_o$; however, it is apparent from FIG. 5 that the magnitude of the desired ratio $\mu_{11}/\mu_{21}$ becomes closer to the value of the ratio $\mu_{12}/\mu_{22}$ for any other element and the analyzer $\theta s$ ability to distinguish one element from another is lost. Moreover, there will be a problem if the measuring channels are spaced so far apart that they encompass a K-edge wavelength of an element that is likely to be contained in the sample. The instrument will then respond when either element is present. The closer the channels are, the greater the difference in absorption in the two channels and the less likelihood there is for an ambiguous indication. An antimony salt is selected for filter 90 and a cesium compound such as cesium oxide is selected for the filter 94. An iodine compound is selected for the filter 92 which is common to both channels $C_1$ and $C_2$. These elements, viz iodine, antimony, and cesium have K-edge wavelengths corresponding to K-edge energies of 33.2 kev., 30.5 kev., and 36 kev. (see FIG 6).

The detectors 100–104 respond to radiation modified by the filters 90–94. The response of the detectors 100, 102, and 104 may be denoted by currents $i_1$, $i_2$, and $i_3$ respectively. By subtracting $i_2$ from $i_1$, and $i_3$ from $i_2$ as diagrammatically indicated by the summing symbols 106 and 108, difference currents $\Delta i_{C1}$ and $\Delta i_{C2}$ are obtained. These difference currents are the output of channels $C_1$ and $C_2$ respectively. The ratio of the difference currents to a zero-absorber difference current $\Delta i_o$ is performed by ratio computers 110, 112. The difference current for channel $C_1$, $[\Delta i_o]_{C_1}$, is determined by removing the sample 82 from the measuring gap and measuring the difference between the current provided by detectors 100 and 102. The difference current for channel $C_2$, $[\Delta_{io}]_{C_2}$, is determined by measuring the difference between the currents provided by detectors 102 and 104. These measured values will be substantially constant so once they are determined they can be set into the ratio computers 110 and 112 as constant divisor quantities.

The reason for this electronic manipulation of the measured chamber currents will be evident from the following mathematical considerations.

For channel $C_1$ the currents under discussion may be defined as follows:

$$[\Delta_{io}]_{C_1} \propto e^{-\mu_1 x_1} - e^{-\mu_2 x_2}$$

where subscripts 1 and 2 refer to the materials of filters 90 and 92. Also $$i_1 \propto e^{-\mu_1 x_1} e^{-\mu_{C_1} x}$$

$$i_2 \propto e^{-\mu_2 x_2} e^{-\mu_{C_1} x}$$

$$\Delta i_{C_1} = i_1 - i_2 \propto e^{-\mu_{C_1} x}[e^{-\mu_1 x_1} - e^{-\mu_2 x_2}]$$

where $\mu_{C_1}$ is the absorption coefficient of the sample iodine of weight per unit area in channel $C_1$ (corresponds to $\mu_{11}$). The ratio computed by computer 110 is $$\frac{\Delta i_{C_1}}{[\Delta i_o]_{C_1}} \propto e^{-\mu_{C_1} x} \qquad (8)$$

For channel $C_2$ we must additionally consider $$[\Delta i_o]_{C_2} \propto -e^{-\mu_2 x_2} - e^{-\mu_3 x_3}$$

and $$i_3 \propto e^{-\mu_3 x_3} e^{-\mu_{C_2} x}$$

where $\mu_{C_2}$ is the absorption coefficient of the sample iodine in channel $C_2$ (corresponds to $\mu_{21}$) and $$\Delta i_{C_2} = i_2 - i_3 \propto e^{-\mu_{C_2} x}[e^{-\mu_2 x_2} - e^{-\mu_3 x_3}]$$

So that the ratio computed by unit becomes $$\frac{\Delta i_{C_2}}{[\Delta i_o]_{C_2}} \propto e^{-\mu_{C_2} x} \qquad (9)$$

To isolate the exponents of Equations 8 and 9, I take the natural logarithm by means of the logarithmic amplifiers 114 and 116. The output signal $S_1$ of log amplifier 114 will be proportional to the quantity $-\mu_{C_1} x$ and the output signal $S_2$ of log amplifier 116 will be proportional to the quantity $-\mu_{C_2} x$. Since the construction of log amplifiers is well known to those skilled in the art, a description is omitted from this disclosure. By employing a ratio computer 118 it is possible to compute the ratio of signal $S_1$ to signal $S_2$ and arrive at the desired ratio $$\frac{\mu_{C_1}}{\mu_{C_2}} = \frac{\mu_{11}}{\mu_{21}}$$

that can be registered upon a meter 120.

OPERATION OF EMBODIMENT II

The ratio computed by the ratio computer 118 and indicated by meter 120 is directly proportional to the ratio of $\mu_{11}/\mu_{21}$ of the element having the same K-edge wavelength as the middle filter 92. For the case chosen, the indicated ratio will be greater than unity for all elements except iodine for which the value drops by approximately one order of magnitude as is apparent from FIG. 5. Once the presence of iodine is confirmed by a null reading on meter 120, the weight per unit area of the sample iodine can be obtained by operating on the output of either computers 110, 112, or the output signals $S_1$, $S_2$ of log amplifiers 114, 116. It is apparent from Equations 8 and 9 that $\mu_{C_1}$ or $\mu_{C_2}$ is known once the presence of iodine is established, and the only unknown is the areal weight $x$ of the sample iodine.

With reference now to FIG. 12, a ratio computer 122 is used to form either the ratio of signal $S_1$ to a signal proportional to $\mu_{C_1}$ on line 124 or the ratio of signal $S_2$ to a signal proportional to $\mu_{C_2}$ on line 126. Either operation yields the value of the sample weight per unit area $x$ which can be displayed upon a meter 128. The mass absorption functional signals comprising the divisor quantities should be adjustable if the sample is being analyzed for an element other than iodine.

In summary, it can be said that my analyzer can take on several different constructions but they all operate in accordance with my novel method of measuring the relative sample absorption or transmission in two narrow wavelength bands spectrally located on either side of the K-edge wavelength of the element to be confirmed. Moreover, I have proposed that a Ross filter technique be employed to establish the two required measurement channels. This provides a system having great stability as the output of each of the two channels $C_1$ and $C_2$ will be proportional to a small difference of large numbers.

Although certain and specific embodiments have been illustrated, modification may be made thereto without departing from the true spirit and scope of the invention or relinquishing any of the advantages attendant thereto.

What is claimed is:

1. Measuring apparatus for analyzing a material for a desired element comprising a source for providing a beam of radiation toward said material, a detector for radiation transmitted by said material, a filter including a first section containing an element of higher atomic number than said desired element, a second section containing said desired element and a third section containing an element having an atomic number less than said desired element, means for successively positioning each of said filter sections between said source and said material, amplifier means connected to said detector for generating a first signal when said first filter section is positioned adjacent said source, a second signal when said second filter section is positioned adjacent said source and a third signal when said third filter section is positioned adjacent said source, means connected to said amplifier for computing the difference between said first and second signal and between said second and third signal, means for amplifying any differences in said two computed differences to provide an output signal proportional to the amount of said element in said material, and means connected to said last-named amplifying means for indicating said output signal.

2. Measuring apparatus for analyzing a material for a desired element comprising a source including a beta-generating radioisotope and a target mounted in the path of said generated beta particles for providing a beam of bremsstrahlung radiation toward said material, a detector for radiation transmitted by said material, a filter including a first section containing an element of higher atomic number than said desired element, a second section containing said desired element and a third section containing an element having an atomic number less than said desired element, means for successively positioning each of said filter sections between said source and said material; amplifier means connected to said detector for generating a first signal when said first filter section is positioned adjacent said source, a second signal when said second filter section is positioned adjacent said source and a third signal when said third filter section is positioned adjacent said source, means connected to said amplifier for computing the difference between said first and second signal and between said second and third signal, means for amplifying any differences in said two computed differences to provide an output signal proportional to the amount of said element in said material, and means connected to said last-named amplifying means for indicating said output signal.

3. Apparatus as set forth in claim 2 which includes means for selecting said radioisotope and target to provide a bremsstrahlung spectra having a peak energy in the vicinity of the K-edge energy of said desired element.

4. Apparatus as set forth in claim 2 in which the difference between the atomic numbers of said filter sections is chosen as small as possible.

5. Apparatus as set forth in claim 2 in which said detector comprises an ionization chamber.

6. The method of determining the presence of a first element in a material containing other elements, comprising the steps of:
irradiating said material with radiation having a predetermined wavelength spectrum, and
comparing the intensity of radiation passing through said material in two different wavelength bands,
one of said bands being spectrally located above the K-edge wavelength of said first element and the other of said bands being spectrally located below said K-edge wavelength.

7. The method of determining the presence of a first element in a material containing other elements, comprising the steps of:
irradiating said material with radiation having a predetermined wavelength spectrum, and
detecting the absorption in said material of said radiation in a first wavelength band spectrally located slightly above the K-edge wavelength of said first element,
detecting the absorption in said material of said radiation in a second wavelength band spectrally located slightly below said K-edge wavelength of said first element, and
comparing said band absorptions to determine any differences therebetween.

8. The method of determining the presence of a first element in a material containing other elements, comprising the steps of:
irradiating said material with radiation having a predetermined wavelength spectrum,
measuring the mass absorption coefficient of said material in two different wavelength bands, each one of which is spectrally located on either side of the K-edge wavelength of said first element, and
computing the ratio of one of said measured band absorption coefficients to the other.

9. The method of determining the presence of a first element in a material containing other elements, comprising the steps of:
irradiating said material with radiation having a relatively wide wavelength spectrum, and
comparing the intensity of radiation passing through said material in each of two different wavelength bands spectrally located contiguous with and on opposite sides of the K-edge wavelength of said first element.

10. The method of determining the presence of a first element in a mixture containing other elements, said method comprising the steps of:
irradiating said mixture with bremsstrahlung radiation having a relatively wide wavelength spectrum,
detecting the amount of radiation absorbed by said mixture in a first and a second wavelength bands spectrally located contiguous with and on opposite sides of the K-edge wavelength of said first element,
determining a value for the mass absorption coefficient in each of said wavelength bands from said detected radiation, and
computing the ratio of one of said band mass absorption coefficient values to the other.

11. The method of determining the weight per unit area of a specific element in a mixture containing several elements, said method comprising the steps of:
irradiating said sample with radiation having a predetermined wavelength spectrum,
measuring the relative absorption in said mixture of said radiation in a first wavelength band located below the K-edge wavelength of said specific element and a second wavelength band located above said K-edge wavelength to confirm the presence of said specific element, and
computing said specific element weight per unit area in accordance with one of said measured relative band absorptions.

12. The method of determining the weight per unit area of a specific element in a mixture containing several elements, said method comprising the steps of:
irradiating said mixture with bremsstrahlung radiation having a relatively wide wavelength spectrum,
measuring the relative absorption by said mixture of said radiation in a first wavelength band and a second wavelength band, both of said wavelength bands being spectrally located contiguous with the K-edge wavelength of said specific element, and
computing said specific element weight per unit area in accordance with one of said measured relative band absorptions.

13. Apparatus for determining the presence of a first element in a material containing other elements comprising:
means for irradiating said material with radiation having a relatively wide wavelength spectrum, and
means for comparing the relative intensity of radiation passing through said material in each of two wavelength bands spectrally located respectively on opposite sides of the K-edge wavelength of said first element.

14. Apparatus for determining the presence of a first element in a material containing other elements, comprising:
a source of broadband radiation for irradiating said material,
means for measuring the absorption in said material of radiation within a narrow wavelength band spectrally located slightly above the K-edge wavelength of said first element,
means for measuring the absorption in said material of radiation within a narrow wavelength band spectrally located slightly below said K-edge wavelength of said first element, and
means for determining any differences in said narrow band absorptions.

15. Apparatus for determining the presence of a first element in a material containing other elements, comprising:
a source of broadband radiation for irradiating said material,
a first measurement channel including
a first filter and a second filter positioned adjacent to said material to attenuate radiation passing therethrough,
said filters having K-edge wavelengths defining a first passband spectrally located below the K-edge wavelength of said first element,
a first detector and a second detector respectively receiving radiation from said first filter and said second filter to provide a first and a second signal and
means for combining said first and said second signals to obtain a first output signal proportional to radiation located within said defined passband,
a second measurement channel including
a third filter and a fourth filter positioned adjacent to said material to attenuate radiation passing therethrough,
said third and fourth filters having K-edge wavelengths defining a second passband spectrally located above said K-edge wavelength of said first element,
a third and a fourth detector respectively receiving radiation from said third and fourth filters to provide a third and a fourth signal, and means for combining said third and said fourth signals to obtain a second output signal proportional to the radiation located within said second passband, means receiving said first and second output signals for providing a signal proportional to the relative absorption by said material of radiation falling within said respective passbands, and means for indicating said relative absorption signal.

16. Apparatus for determining the presence of first element in a mixture containing other elements, comprising:

a source directing bremsstrahlung radiation toward said mixture, a first measurement channel including a first filter and a second filter positioned adjacent said mixture to attenuate radiation passing therethrough, said filters having K-edge wavelengths defining a first passband spectrally located below the K-edge wavelength of said first element but contiguous therewith, a first and a second detector respectively receiving radiation from said first filter and said second filter to provide a first and a second signal, and means responsive to the difference between said first and second signals to provide a first output signal proportional to radiation detected by said detectors and located within said first passband, a second measurement channel including a third filter positioned adjacent to said mixture to attenuate radiation passing therethrough, said third filter having a K-edge wavelength spectrally located above that of said second filter to define a second passband, a third detector receiving radiation from said third filter to provide a third signal, and means responsive to the difference between said second and said third signals to provide a second output signal proportional to radiation detected by said detectors and located within said second passband, amplifier means receiving said first and said second output signals to provide a third signal proportional to any difference in said received signals, and means for indicating said third output signal.

17. Apparatus for determining the presence of first element in a mixture containing other elements, comprising:

a source directing bremsstrahlung radiation toward said mixture, a first measurement channel including a first filter and a second filter positioned adjacent said mixture to attenuate radiation passing therethrough, said filters having K-edge wavelengths defining a first passband spectrally located below the K-edge wavelength of said first element but contiguous therewith, a first and a second detector respectively receiving radiation from said first filter and said second filter to provide a first and a second signal, and means responsive to the difference between said first and second signals to provide a first output signal proportional to radiation detected by said detectors and located within said first passband, a second measurement channel including a third filter positioned adjacent to said mixture to attenuate radiation passing therethrough, said third filter having a K-edge wavelength spectrally located above that of said second filter to define a second passband, a third detector receiving radiation from said third filter to provide a third signal, and means responsive to the difference between said second and said third signals to provide a second output signal proportional to radiation detected by said detectors and located within said second passband, logarithmic amplifier means receiving said first and said second output signals to provide a third and a fourth output signal respectively proportional to the natural logarithm of said first and said second output signals, and means for computing the ratio of one of said third and said fourth output signals to the other.

18. Apparatus for determining the presence and quantity of a first element in a mixture containing other elements, comprising:

a source of broadband radiation for irradiating said mixture, means for measuring the absorption in said mixture of said radiation within a narrow wavelength band spectrally located slightly above the K-edge wavelength of said first element, means for measuring the absorption in said mixture of said radiation within a narrow wavelength band spectrally located slightly below said K-edge wavelength of said first element, means for determining any differences in said narrow band absorptions to confirm the presence of said first element in said mixture, and means responsive to one of said measured narrow band absorptions for determining the weight per unit area of said confirmed element in said mixture.

19. Apparatus for determining the presence and quantity of a first element in a mixture containing other elements, comprising:

a source of broadband radiation for irradiating said mixture, a first measurement channel including a first filter and a second filter positioned adjacent to said mixture to attenuate radiation passing therethrough, said filters having K-edge wavelengths defining a first passband spectrally located below the K-edge wavelength of said first element.

a first detector and a second detector respectively receiving radiation from said first filter and said second filter to provide a first and a second signal, and means for combining said first and said second signals to obtain a first output signal proportional to radiation located within said defined passband, a second measurement channel including a third filter and a fourth filter positioned adjacent to said mixture to attenuate radiation passing therethrough, said third and fourth filters having K-edge wavelengths defining a second passband spectrally located above said K-edge wavelength of said first element, a third and a fourth detector respectively receiving radiation from said third and fourth filters to provide a third and a fourth signal, and means for combining said third and fourth signals to obtain a second output signal proportional to the radiation located within said second passband, means receiving said first and second output signals for providing a signal proportional to the relative absorption by said mixture of radiation falling within said respective passbands, means for indicating said relative absorption signal, and means responsive to one of said first and said second output signals to provide a signal proportional to the weight per unit area of said element in said sample.

20. Apparatus for determining the presence and quantity of a first element in a mixture containing other elements, comprising:
- a source for directing bremsstrahlung radiation toward said mixture,
- a first measurement channel including
    - a first filter and a second filter positioned adjacent said mixture to attenuate radiation passing therethrough,
        - said filters having K-edge wavelengths defining a first passband spectrally located below the K-edge wavelength of said first element but contiguous therewith,
    - a first and a second detector respectively receiving radiation from said first filter and said second filter to provide a first and a second signal, and
    - means responsive to the difference between said first and second signals to provide a first output signal proportional to radiation detected by said detectors and located within said first passband,
- a second measurement channel including
    - a third filter positioned adjacent to said mixture to attenuate radiation passing therethrough,
        - said third filter having a K-edge wavelength spectrally located above that of said second filter to define a second passband,
    - a third detector receiving radiation from said third filter to provide a third signal, and
    - means responsive to the difference between said second and said third signals to provide a second output signal proportional to radiation detected by said detectors and located within said second passband,
- logarithmic amplifier means receiving said first and said second output signals to provide a third and a fourth output signal respectively proportional to the natural logarithm of said first and said second output signals,
- means for computing the ratio of one of said third and said fourth output signals to the other,
- means for indicating said computed ratio to confirm the presence of said first element whenever said computed ratio value deviates from a standard value therefor, and
- means operative upon deviation of said computed ratio value from said standard value for computing the value of one of said first and said second output signals relative to the mass absorption coefficient of said confirmed element in said first passband and in said second passband,
    - said computed value being proportional to the weight per unit area of said confirmed element in said mixture.

References Cited

UNITED STATES PATENTS 2,999,937   9/1961   Kohler.
3,030,512   4/1962   Harker.

OTHER REFERENCES

Cullity, B. D.: Elements of X-Ray Diffraction, Addison-Wesley Publishing Co. (1956), pp. 211–213.

RALPH G. NILSON, *Primary Examiner*.

SAUL ELBAUM, *Assistant Examiner*.

U.S. Cl. X.R.

250—52, 106